United States Patent
Gaudet

(10) Patent No.: US 8,258,207 B2
(45) Date of Patent: Sep. 4, 2012

(54) BLENDS OF CARBON BLACKS AND PRODUCTS CONTAINING THE SAME

(75) Inventor: Gregory T. Gaudet, Acton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/095,957

(22) Filed: Apr. 28, 2011

(65) Prior Publication Data

US 2011/0201743 A1  Aug. 18, 2011

Related U.S. Application Data

(62) Division of application No. 11/435,268, filed on May 16, 2006, now Pat. No. 7,959,726.

(60) Provisional application No. 60/681,399, filed on May 16, 2005.

(51) Int. Cl.
*B60C 1/00* (2006.01)
*C08J 3/00* (2006.01)
*C08K 3/00* (2006.01)
*C08K 3/04* (2006.01)
*C08K 3/22* (2006.01)
*C08K 3/34* (2006.01)
*C08K 7/00* (2006.01)
*C08K 7/16* (2006.01)
*H01B 1/12* (2006.01)

(52) U.S. Cl. ........ 523/220; 152/151; 152/905; 523/223; 524/401; 524/492; 524/493; 524/495; 524/496; 524/497; 524/571

(58) Field of Classification Search .......... 523/220, 523/223; 524/401, 492, 493, 495, 496, 497, 524/571; 152/151, 905
See application file for complete search history.

(56) References Cited

U.S. PATENT DOCUMENTS

| | | | |
|---|---|---|---|
| 3,364,156 A | 1/1968 | Kraus | |
| 5,294,253 A | 3/1994 | Carlson et al. | |
| 5,430,087 A | 7/1995 | Carlson et al. | |
| 6,050,876 A | 4/2000 | Ouyang et al. | |
| 2001/0009654 A1 | 7/2001 | Kawazoe et al. | |
| 2006/0258794 A1 | 11/2006 | Gaudet | |

FOREIGN PATENT DOCUMENTS

| | | |
|---|---|---|
| JP | 61-028560 | 2/1986 |
| JP | 61-174271 | 8/1986 |
| JP | 64-056777 | 3/1989 |
| JP | 05-017704 | 1/1993 |
| JP | 11-100525 | 4/1999 |
| JP | 2002-047434 | 2/2002 |
| JP | 2002-241643 | 8/2002 |
| JP | 2003-020419 | 1/2003 |
| JP | 2003-165925 | 6/2003 |

OTHER PUBLICATIONS

International Search Report and Written Opinion of the International Search Report for PCT/US2006/018724 dated Oct. 24, 2006.
Janzen et al., "Effects of Particle Size and Structure Aggregate Size Distributions in Carbon Black Reinforcement of Elastomers," International Rubber Conference, Brighton, May 1972 (7 pages).
Office Action issued in corresponding Japanese Patent Application No. 2008-512401 dated Dec. 13, 2011 with English translation attached (9 pages).

*Primary Examiner* — Patrick Niland

(57) ABSTRACT

Blends of carbon black or other fillers is described. The blends of carbon black or other fillers are preferably pre-blended prior to introducing the blend into a product such as an elastomeric or polymeric product.

20 Claims, 5 Drawing Sheets

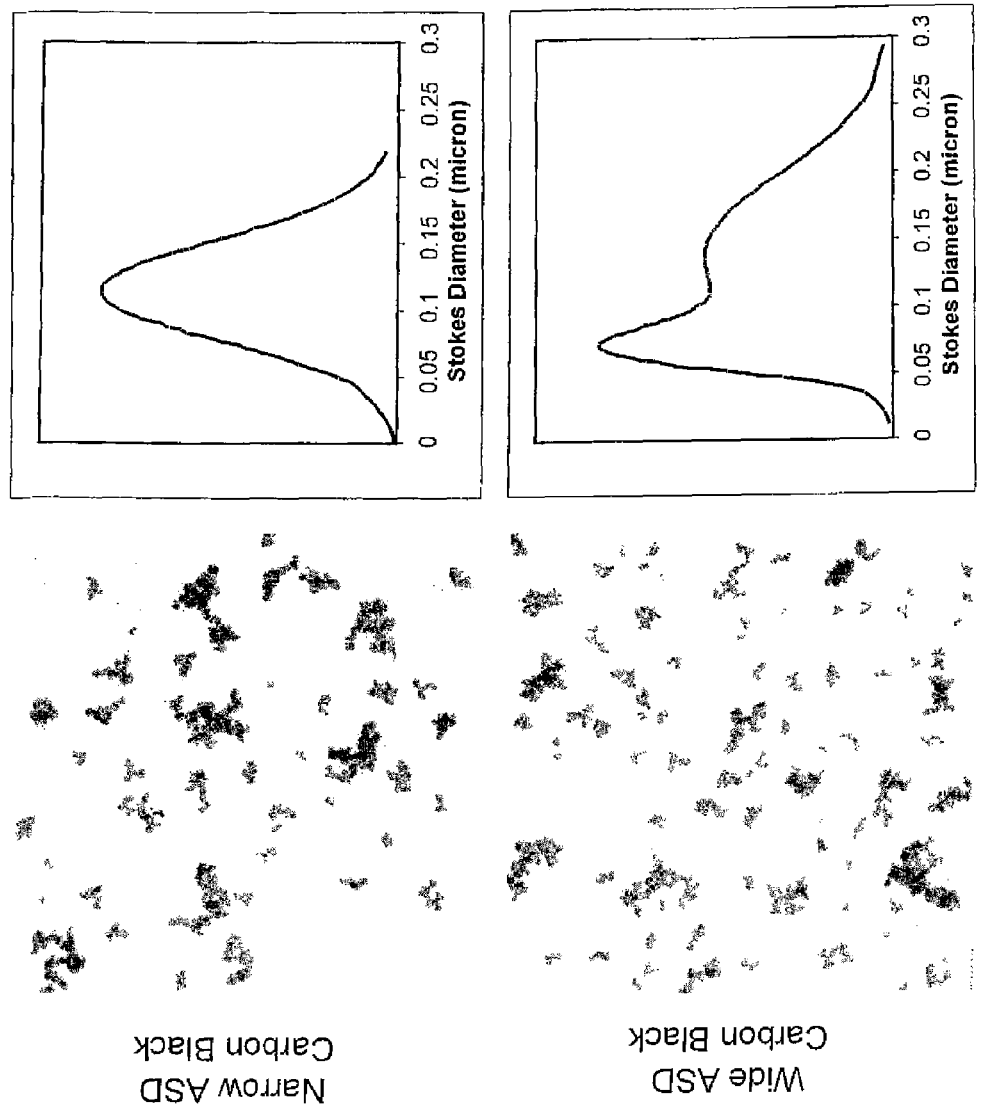
Figure 1 – TEM photographs and aggregate size distributions for a typical narrow ASD carbon black, and a typical wide ASD carbon black

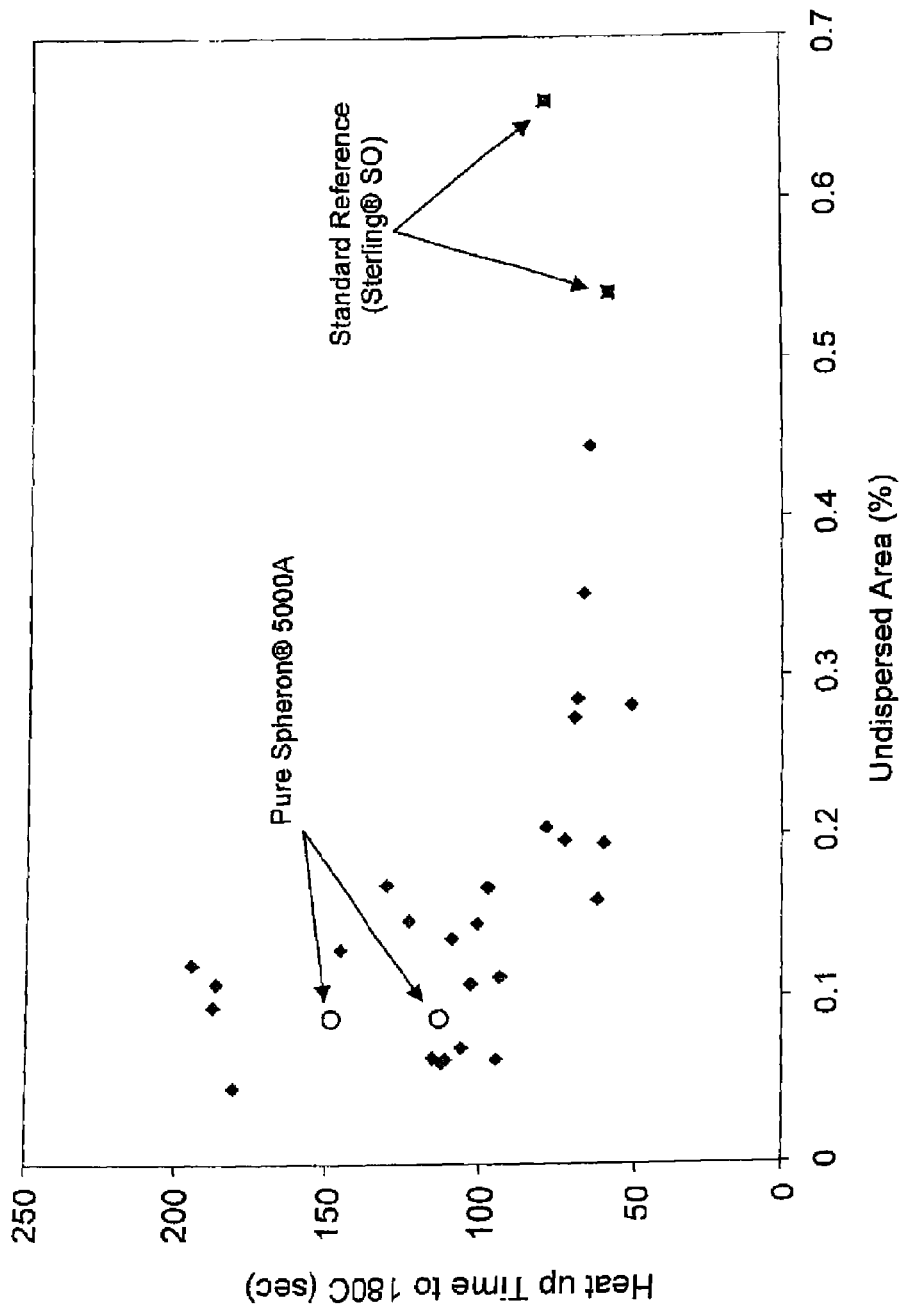
Figure 2 - UHF receptivity and dispersion quality for commercial blends of Spheron® 5000A and Vulcan® 1391

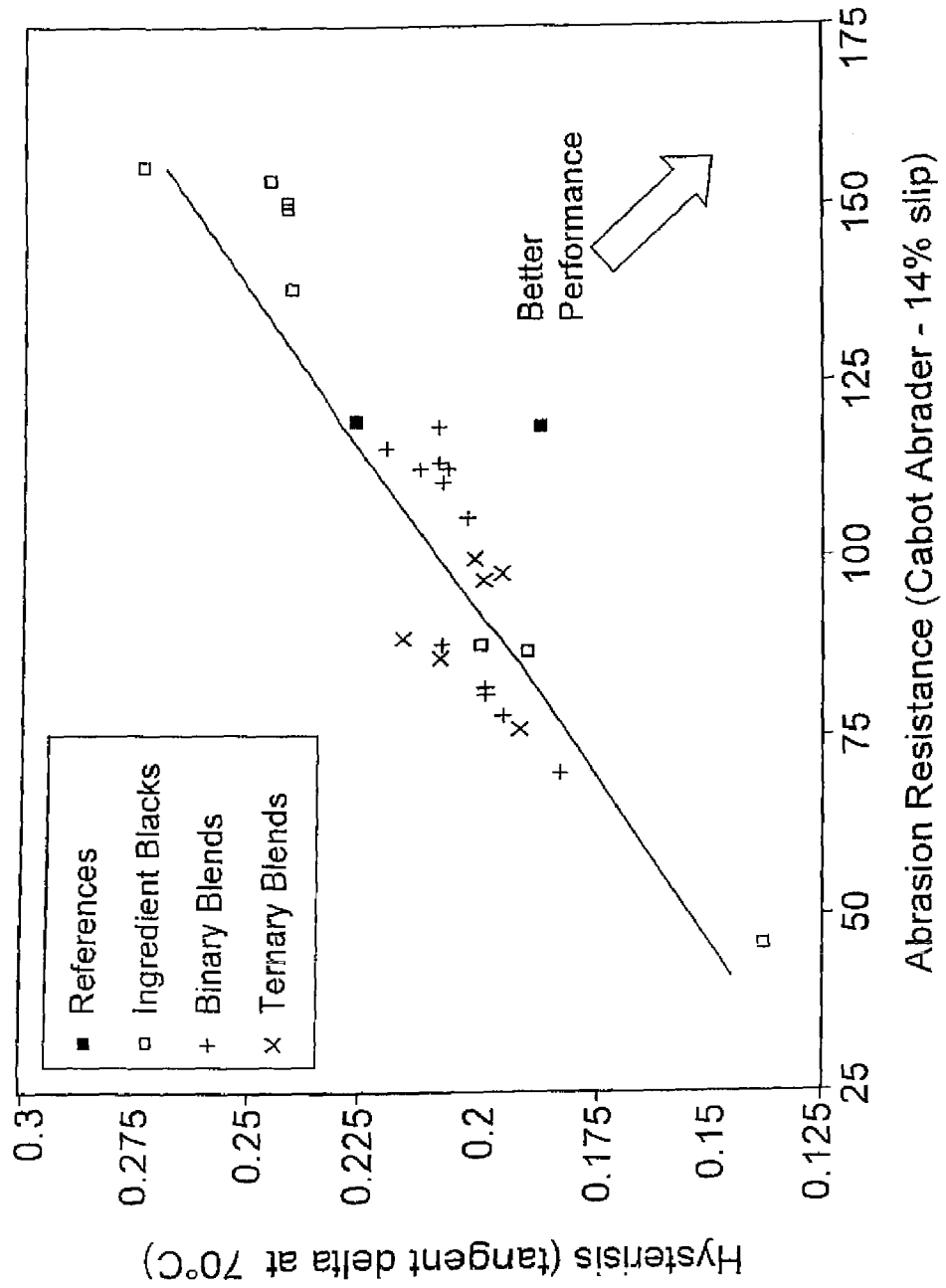
Figure 3 - Treadwear versus Hysterisis for blended carbon blacks with ingredient grades and references

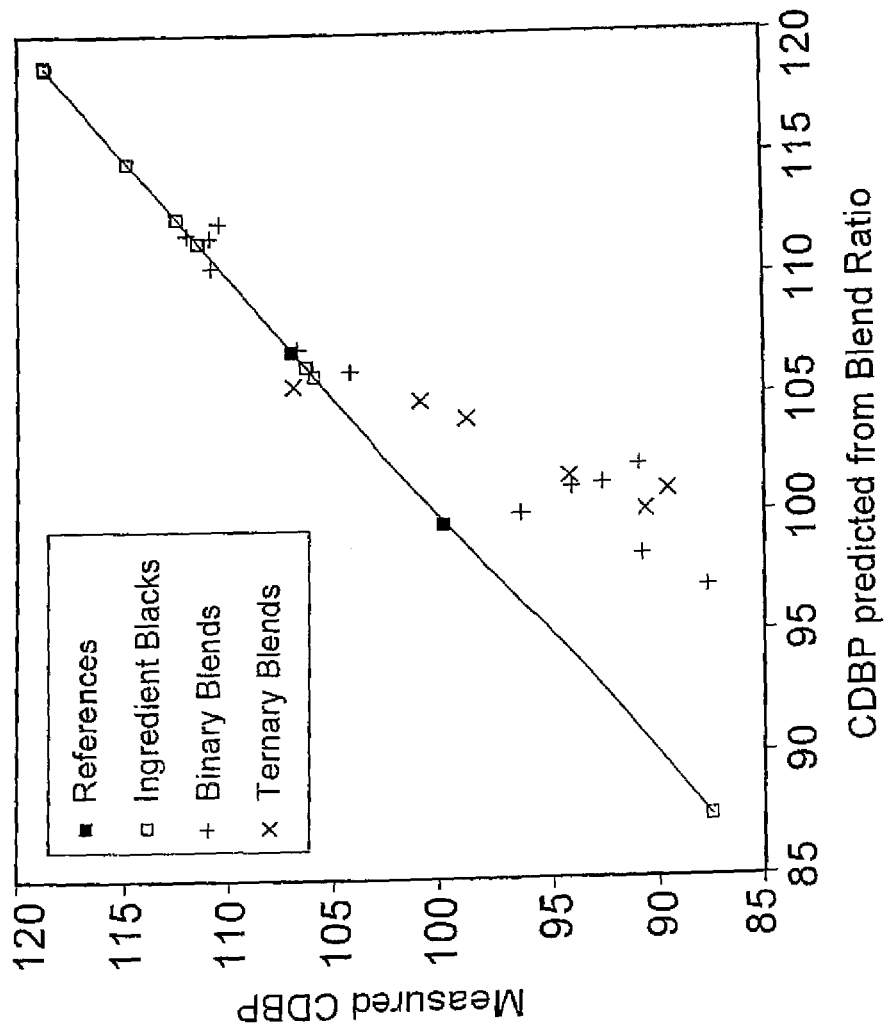
Figure 4 - Measured CDBP of blended carbon blacks, compared to CDBP predicted from the ingredient grades (values in Table 5)

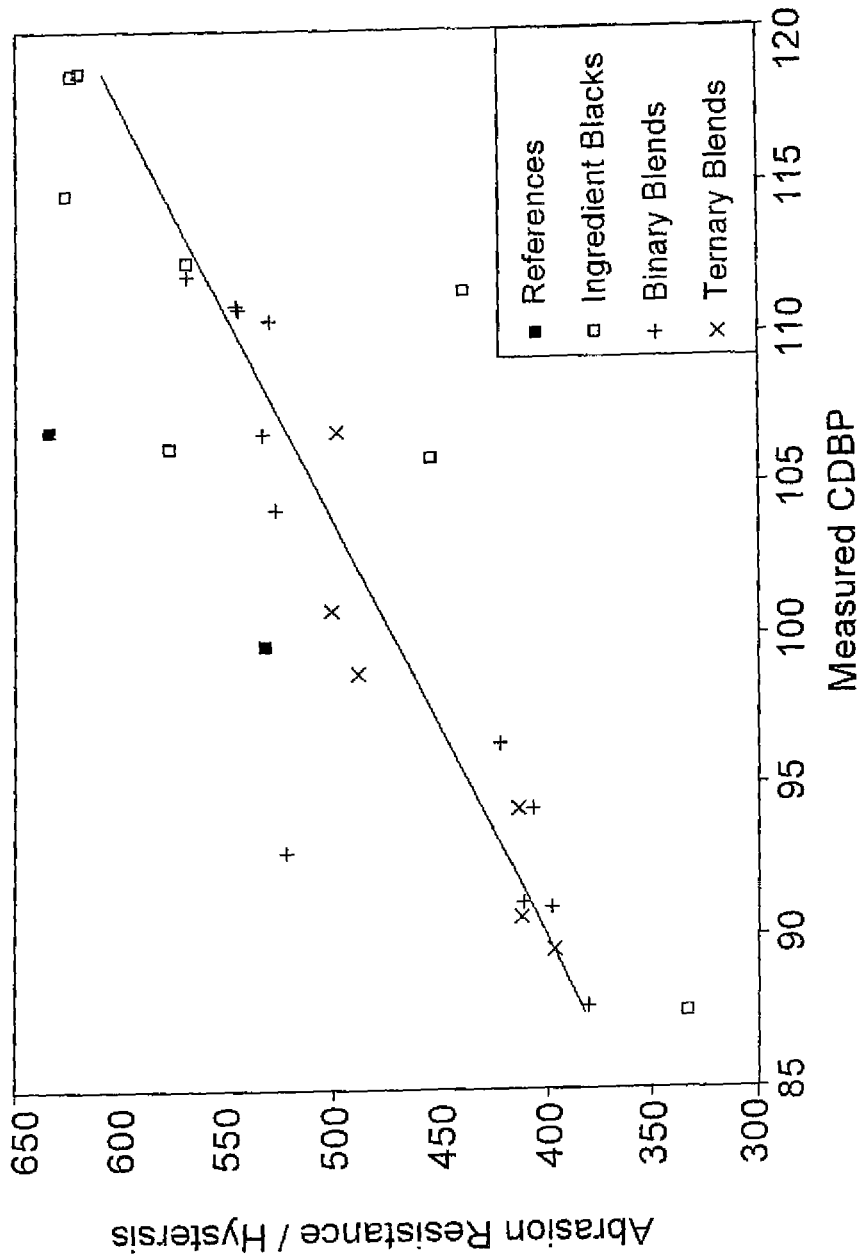
Figure 5 - Treadwear / Hysterisis performance of blended carbon blacks versus measured CDBP of the blend.

# BLENDS OF CARBON BLACKS AND PRODUCTS CONTAINING THE SAME

This application is a divisional of U.S. patent application Ser. No. 11/435,268, filed May 16, 2006 (now allowed), which in turn claims the benefit under 35 U.S.C. §119(e) of prior U.S. Provisional Patent Application No. 60/681,399, filed May 16, 2005, which are incorporated in their entirety by reference herein.

BACKGROUND OF THE INVENTION

The present invention relates to carbon blacks and other fillers, and more particularly relates to blends of two or more types of carbon blacks or fillers, and further relates to products containing blends of carbon blacks or fillers.

Using two or more types of carbon blacks in a single product is possible. Typically, when an end user wishes to use two different types of carbon blacks, the end user typically adds the two different types of carbon blacks into the mixer separately along with the other components. For instance, for a polymeric product, the manufacturer will introduce all of the ingredients into the mixer and mix all of the components together. It was believed that it was not relevant how the two different types of carbon blacks were introduced into the mixer in forming the end product, such as the polymer product. Further, it was believed that the polymeric product will typically achieve the properties of each type of carbon black present based on the percent of each type of carbon black present in the polymeric product.

SUMMARY OF THE PRESENT INVENTION

It is a feature of the present invention to improve ways to introduce two or more types of carbon blacks or fillers into a product, such as a polymeric product or elastomeric product.

It is a further feature of the present invention to provide intimate blends of carbon blacks or other fillers.

Another feature of the present invention is to use blends of carbon blacks that can provide improved performance compared to single grades of carbon black.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to blends of carbon black (or fillers in general) that contain at least two different types of carbon black (or fillers).

The present invention further relates to blends of carbon black (or fillers) which are blended together prior to being introduced to other components that form an end product, such as a polymeric product or an elastomeric product.

A further feature of the present invention is carbon black blends of two or more different types of carbon black which provide a substantially unimodal or unimodal aggregate size distribution (ASD).

The present invention further relates to blends of carbon blacks that have a pore size distribution that is unimodal or substantially unimodal.

The present invention further relates to compositions or products containing the blends of carbon black described herein.

The present invention further relates to a method of making products containing carbon black wherein a blend of two or more different types of carbon blacks are blended together prior to being introduced or combined or mixed with the other components that form the product.

The present invention further relates to a blend of carbon black that is blended together by milling, such as by high-energy milling.

The present invention also relates to blends of fillers or reinforcing agents in general that can be used or have the benefits described herein for carbon blacks.

It is to be understood that both the foregoing general description and the following detailed description are exemplary and explanatory only and are intended to provide a further explanation of the present invention, as claimed.

The accompanying figures, which are incorporated in and constitute a part of this application, illustrate several embodiments of the present invention and, together with the description, serve to explain the principles of the present invention.

BRIEF DESCRIPTION OF FIGURES

FIG. 1 are TEM photographs and aggregate size distributions for a typical narrow ASD carbon black, and a typical wide ASD carbon black.

FIG. 2 is a graph showing receptivity and dispersion quality for commercial blends of Spheron® 5000A carbon black and Vulvan® 1391 carbon black.

FIG. 3 is a graph showing Treadwear versus Hysterisis for blended carbon blacks with ingredient grades and references.

FIG. 4 is a graph showing measured CDBP of blended carbon blacks, compared to CDBP predicted from the ingredient grades (values in Table 5).

FIG. 5 is a graph showing Treadwear/Hsyterisis performance of blended carbon blacks versus measured CDBP of the blend.

DETAILED DESCRIPTION OF THE PRESENT INVENTION

In at least one embodiment, the present invention relates to carbon black and, in particular, blends of two or more different types of carbon blacks. In a broader embodiment, the present invention further relates to blends of fillers or reinforcing agents, such as carbon black, silica, other metal oxides, other inorganic fillers, and the like. While the preferred embodiment, which is blends of two or more different types of carbon blacks will be discussed in significant detail below, it is to be understood that the present invention extends to blends of two or more different types of fillers or reinforcing agents in general, such as a blend of one type of carbon black with one type of silica and so on. The filler or reinforcing agent, such as carbon black, can be any commercially-available carbon black, such as those provided by Cabot Corporation, Degussa Corporation, and the like. There is no criticality whatsoever to the type of carbon black that is blended with another type of carbon black or other reinforcing agent or filler. The blends of carbon black will contain two or more different types of carbon blacks. Thus, the blends of carbon blacks can have any physical, analytical and/or morphological properties. Examples of suitable carbon blacks include those listed herein, as well as non-conductive or conductive furnace blacks, Cabot's Black Pearls® carbon blacks, Cabot's Vulcan® carbon blacks, Cabot's Sterling® carbon blacks, Cabot's United® carbon blacks, Cabot's Regal® carbon blacks, Cabot's Spheron® carbon blacks, Cabot's Monarch® carbon blacks, Cabot's Elftex® carbon blacks, Cabot's Emperor® carbon blacks, Cabot's IRX™ carbon blacks, Cabot's Mogul® carbon blacks, Cabot's CRX™ carbon blacks, Cabot's CSX™ carbon blacks, Cabot's Ecoblack® carbon blacks, Degussa's CK-3 carbon black, Degussa's Coraxi® carbon blacks, Degussa's Durex® carbon blacks, Degussa's Ecorax carbon blacks, Degussa's Printex® carbon blacks, Degussa's Purex® carbon blacks. Other examples include lamp blacks, carbon black having attached chemical group(s), such as an organic group, silicon-treated carbon blacks, metal-treated carbon blacks, silica-coated carbon blacks, chemically-treated (e.g., surfactant-treated) carbon black, and any grades of carbon black. Typically, the blends of carbon blacks will be blends of carbon blacks having similar end use applications but differing in physical, chemical, analytical, and/or morphological properties.

As stated, the blends of carbon blacks can be two or more different types of carbon blacks, such as three types of carbon blacks, four types of carbon blacks, five or more types of carbon blacks, and the like.

Further, as stated above, blends of carbon black with other reinforcing agents or fillers can also be used. Further, blends of reinforcing agents and/or fillers other than carbon blacks can be used in the same manner as described throughout.

In preparing the blends of carbon black, preferably, the different types of carbon blacks are blended together prior to introducing the carbon blacks to the other ingredients which form the end product. In other words, and strictly as an example, if an elastomeric compound is being formed, the blend of carbon black is preferably blended and prepared separately and then introduced with one or more other components that form the elastomeric compound. Thus, the blends of carbon black are preferably pre-blended prior to introduction with other components. The blending of the carbon black can occur using any blending techniques. Preferably, the blending of the carbon black is achieved by blending techniques which provide an intimate blend of the two or more different types of carbon black. For instance, the blending of the carbon blacks can be achieved using milling, such as a high-energy mill with or without milling media. Even pelletizing can, at times, achieve the desired degree of blending preferred for purposes of the present invention. The milling can be dry milling or wet milling. The high-energy mill can be any high-energy mill, for example, a centrifugal mill, such as a planetary ball mill, for instance, one from Glenn Mills, Inc. or Retsch. Other examples of high-energy milling include, but are not limited to, jet mills, like a spinning air flow jet mill, or fluid energy mills, like an opposed jet fluid energy mill. Also, an Attritor mill can be useful for purposes of the present invention. Examples of mills are also set forth in U.S. Pat. Nos. 5,522,558; 5,232,169; 6,126,097; and 6,145,765, all incorporated in their entirety by reference herein.

In at least one embodiment, the mill, such as the high-energy mill, is rotated at a sufficient speed so as to impart a high-impact force of from about 0.1 G to about 25 G to the milling media and/or to the powder. For instance, the high-energy mill can be rotated from about 100 to about 400 rpm or more. The milling of the carbon black or other fillers, for instance, in a mill can occur for any predetermined amount of time, such as 24 hours or less, 10 hours or less, from about 5 minutes to about 10 hours, or any other times in between.

The blending of the carbon blacks in at least one embodiment is preferably done so that the aggregate size distribution of the blended powders provides a substantially unimodal aggregate size distribution or a completely unimodal aggregate size distribution. The unimodal aggregate size distribution can have an extended shoulder, but preferably there is only one peak in the entire aggregate size distribution for the blended carbon black. This type of size distribution shows the preferred intimate blending of the two carbon blacks or other fillers. One example of a unimodal aggregate size distribution is shown in FIG. 1 (a peak without a shoulder and a peak with a shoulder).

In another embodiment, the blend of carbon black or other fillers has a unimodal pore size distribution, such as measured by a log differential intrusion (mL/g) or other pore size distribution measuring technique. Again, this pore size distribution for the blended carbon black or filler will preferably have a unimodal pore size distribution with or without an extended shoulder. The aggregate size distribution and/or pore size distribution for the blended carbon black or fillers can have a narrow size distribution or a wide size distribution depending upon the types of carbon blacks or fillers used and/or depending upon the amount of intimate blending that is desired.

In another embodiment, the present invention can have a blended carbon black or filler that has a unimodal aggregate size distribution, as well as a unimodal pore size distribution.

The blends of carbon black or other fillers can be used in any end use applications, such as polymer products, elastomeric products, tire applications, cable, molding, fuel cells, inks, coatings, toners, and any application wherein conventional carbon black or fillers are useful.

The present invention, in at least one embodiment, permits uniform distribution of the different types of carbon black (or fillers) throughout the product containing the carbon black (or filler) and further provides properties previously not achievable with the introduction of one type of carbon black or the separate introductions of two or more different types of carbon blacks in the product. In at least one embodiment, the chemical, morphological, and/or analytical properties of the blends of the carbon black are different than what would be predicted from the properties of the starting carbon blacks or fillers. For instance, the DBP and/or crushed DBP of the blends can be different than the individual carbon blacks forming the blend and, for instance, can be lower than expected. In more detail, generally, the chemical, morphological, and/or analytical properties of two or more fillers, such as carbon blacks, when used together can be predicted based on the amount of carbon black or filler used for each filler or carbon black that is present. Generally, this involves averaging the particular property for each filler or carbon black based on the amount of that particular ingredient present in the composition. With the present invention, and by providing an intimate blend of the fillers and by blending the fillers prior to introducing the fillers into a formulation or batch, the chemical, morphological, and/or analytical properties of the blend, in some embodiments, can be different than the predicted value of the two or more fillers (e.g., carbon blacks) present. As a particular example, the DBP and/or crushed DBP of the blend, in some embodiments, can be lower than the predicted value of the combined DBP of the particular fillers present (based on an averaging of each DBP of each filler and based on the amount of the particular filler present). The DBP of the blend of the present invention can be lower than the average of the two or more fillers making up the blend (based on the amount of each component present) and/or the DBP of the blend can be lower than any of the DBP of each individual filler present. As a more specific example, for instance, in a 90/10 blend of two carbon blacks (wherein the 90/10 is based on weight %), carbon black A has a DBP of 119 cc/100 g, and carbon black B has a DBP of 133.9 cc/100 g, and, thus, the predicted DBP value based on the weight percent and DBP value for each carbon black would be 120.5 cc/100 g, and yet by preparing an intimate pre-blend of the carbon blacks, the DBP as measured is 112.4 cc/100 g, which is lower than the predicted value and, in this instance, also lower than each of the individual DBP values that make up the blend. Similarly, carbon black A can have a crushed DBP value of 82.6 cc/100 g, while carbon black B has a crushed DBP of 98.4 cc/100 g, therefore, leading to a predicted value based on a 90/10 weight percent blend of 84.2 cc/100 g, and yet by preparing an intimate blend, based on the present invention, the measured blend actually has a crushed DBP of 78.2 cc/100 g, which, again, is lower than the predicted value, and also lower than each individual crushed DBP value for each carbon black present. The DBP and/or crushed DBP of the blend of the present invention can be 1%, 2%, 3%, 4%, 5%, 6%, 7%, 8%, 9%, 10%, or more different than the predicted value for DBP and/or crushed DBP. This unexpected result can further apply to other analytical properties for the filler.

In another embodiment of the present invention, the blends of carbon blacks (or filler) can be sufficiently blended such that the Stokes diameter (in microns) provides a unimodal distribution and/or a unimodal Stokes diameter distribution with an extended shoulder. In either case, only one peak is preferably formed for the Stokes diameter distribution for the blended carbon black (or filler). For instance, the Stokes diameter can be from about 0.1 to about 0.3 micron for the peak with or without an extended shoulder. The Stokes diameter can be larger, such as above 0.3 micron.

For purposes of the present invention, the blends of carbon black or the fillers can be at any ratio. For instance, the blends of two different types of carbon blacks can be at a 50/50 weight ratio or can be at any other weight ratio, such as 90/10 to 10/90 or 1/99 to 99/1 based on the weight percent of the blended carbon black (or filler). When three or more different types of carbon blacks (or filler) are present, the weight ratios for each component forming the blend can be any amount. The variation in the weight percentage of each component forming the blend can be based on the desired reinforcing or filler properties in the end product.

Using a combination of commercial and experimental carbon blacks, Janzen and Kraus (Janzen, J., and G. Kraus, "Effects of Particle Size and Structure Aggregate Size Distributions in Carbon Black Reinforcement of Elastomers," International Rubber Conference, Brighton, May 1972, incorporated in its entirety by reference herein) prepared two series of carbon black blends. In the first series, carbon blacks with different specific surface areas were blended. In the second series, carbon blacks with the same specific surface area, but different structure, as measured by DBP absorption, were blended. They concluded that the blends had slightly lower abrasion resistance and slightly lower hysterisis compared to a single grade of carbon black. Within experimental error, the blends did not have a different abrasion resistance/hysterisis trade-off.

FIG. 1 shows a typical furnace carbon black with a narrow ASD, compared to another furnace carbon black with approximately the same specific surface area, but a wider ASD. The electron micrographs and ASD measurements show that the wide ASD carbon black is composed of two separate populations of aggregates. One ASD peak is composed of small primary particles and small aggregates, while the other peak is composed of larger primary particles and larger aggregates. In the present invention, it is possible to re-create the performance of the wide ASD carbon black by blending two narrow ASD carbon blacks with the appropriate surface areas and structures.

EXAMPLES

The present invention will be further clarified by the following examples, which are intended to be exemplary of the present invention. The following testing procedures were utilized in the determination and evaluation of the analytical properties of the carbon blacks utilized in the following examples. The DBP (dibutyl phthalate adsorption value) of the carbon black was determined according to the procedure set forth in ASTM D2414. The $I_2$ No. (iodine adsorption number) of the carbon blacks was determined according to ASTM D1510. CTAB (cetyltrimethyl ammonium bromide) absorption value of the carbon blacks was determined according to ASTM Test Procedure D3765-85. Tinting strength (Tint) of the carbon blacks was determined according to ASTM Test Procedure D3265-85a. The CDBP (dibutyl phthalate adsorption value) of the crushed carbon blacks was determined according to the procedure set forth in ASTM D3493-86. With respect to the nitrogen surface area and the statistical thickness surface area (STSA), these measurements were made following ASTM D6556. In the first experiment, a blend of carbon blacks was produced at commercial scale to improve the UHF receptivity for EPDM extruded profiles. In the second experiment, laboratory scale blends of carbon blacks were produced to explore the abrasion resistance/hysterisis trade-off.

Cabot Corporation produced all the carbon blacks used in the experiments: Vulcan® 7H is an industry standard N234; Vulcan® 1436 is a wide ASD carbon black used to improve hysterisis; Vulcan® 1391 is a very high surface area carbon black used for high performance tires; Spheron® 5000A is an ultra-clean low surface area carbon black, used for extruded profiles; Sterling® SO is an industry standard N550; M-XXXX designates an experimental carbon black produced at Cabot's pilot facility in Pampa, Tex. (The carbon black tradenames are all registered trademarks of Cabot Corporation.) The analytical properties of the carbon blacks and the blends were measured using ASTM methods.

For the commercial scale blends tested in EPDM rubber, the blended carbon black was produced by adding the high surface area carbon black to the production stream during the manufacture of the low surface area carbon black. The EPDM test formulation is shown in Table 1. Standard laboratory scale rubber mixing equipment was used. The UHF heat up time was measured in a commercial microwave oven. The undispersed area was measured using a proprietary system, based on the IBAS Compact model image analyzer available from Kontron Electronik GmbH (Munich, Germany).

For the laboratory scale blends tested in SBR rubber, the blended carbon blacks were produced by rolling the ingredient grades together to ensure a good mixture. The SBR test formulation is shown in Table 2. Standard laboratory scale rubber mixing equipment was used. The dynamic properties were measured by an RPA instrument from Alpha Technologies. The abrasion resistance was measured using the proprietary "Cabot Abrader", as described in U.S. Pat. No. 6,050,876, incorporated in its entirety by reference herein.

Blends in EPDM.—Low area carbon blacks are commonly used for automotive extruded profiles in EPDM rubber. The low area allows for high carbon black loading, and also gives a smooth surface appearance to the extrusion. However, low area carbon blacks are usually less receptive to UHF energy. For manufacturers who use microwave ovens to cure their extrusions, this lower receptivity results in lower line speed and lower productivity, since the extruded profile requires more time in the microwave oven to cure properly. So, there is a performance trade-off, with higher area carbon blacks giving more productivity, but poorer surface appearance of the extruded profile, and low area carbon blacks giving a better quality product, but lower productivity.

Some compounders may mix a small fraction of a high surface area carbon black with the low area black in the polymer, to improve the UHF receptivity. If the carbon blacks are not uniformly dispersed in the polymer, this can result in rubber domains that are enriched in the high area black, and "hot spots" in the microwave oven. One option is to blend the carbon blacks with each other first, instead of adding them separately at the rubber mixer. In addition to avoiding hot spots, blending the carbon blacks in advance allows the low area black to act as a dispersing aid for the high area black, giving a better overall surface appearance.

In one experiment, a small fraction of a high area carbon black was blended into a black normally used for EPDM extrusions. The blend was made of nominally 90% Spheron® 5000β carbon black and 10% Vulcan® 1391 carbon black. Table 3 shows the analytical properties of the starting blacks, the expected properties of a 90/10 blend, and the actual properties measured on the blends during the trial. It is interesting to note that both the DBP and CDBP of the blends are considerably lower than predicted from the properties of the starting carbon blacks. This may be because the aggregates of the higher surface area carbon black fit into the voids of the lower surface area carbon black.

FIG. 2 shows the performance of the blends, compared to the "parent" carbon black, Spheron® 5000A carbon black, and also compared to a typical higher area carbon black grade used for extrusions, Sterling® SO (N550) carbon black. The figure shows that the Spheron® 5000A carbon black gives excellent dispersion/surface appearance, as indicated by the low undispersed area, but at a cost of longer heat up time. In contrast, the Sterling® SO carbon black gives quick heat up, but relatively greater undispersed area. Surface defect counts for the EPDM profiles made with Sterling® SO carbon black are also higher than for those made with the Spheron® 5000A carbon black.

The blend results show that the trade-off between heat-up time and dispersion is not linear. In fact, it is possible to decrease the heat-up time significantly with little to no impact on dispersion quality. In a good blend, the Spheron® 5000A carbon black may be acting as a dispersing aid for a small quantity of the high surface area grade, preventing undispersed area and surface defects. At the same time, a good blend of the carbon blacks ensures a good blend in the EPDM rubber, which should prevent hot spots in the curing oven.

This simple example shows that there are applications in which carbon black blends can provide a better combination of performance properties than single carbon blacks.

Blends in a Tire Tread Formulation.—A more complicated problem is the trade-off of treadwear and hysterisis in a tire compound. As a first step to explore this problem, a series of binary and ternary blends of carbon blacks was produced. The goal was to compare the performance of these blends to two standard carbon blacks. The first black, Vulcan® 7H (N234) carbon black, is a typical carbon black with a narrow aggregate size distribution. The second black, Vulcan® 1436 carbon black, has a wider aggregate size distribution, and shows a better balance of treadwear and hysterisis. The experiment was designed to discover whether widening the ASD by blending gives the same treadwear/hysterisis advantage as a wide ASD black that is produced in the normal furnace carbon black process.

Table 4 shows the analytical properties of the "ingredient grades" used for the treadwear/hysterisis experiment. Each blend was designed to match the STSA and CDBP of either Vulcan® 7H carbon black or Vulcan® 1436 carbon black. Because of the depression of CDBP, and to a lesser degree tint, which occurs with blending, not all of the blends had the desired target analytical properties. Table 5 shows a typical example in which the CDBP of the blend was very low compared to the CDBP of its ingredient grades. Table 6 shows the blend ratios and measured analytical properties of all of the carbon black blends.

FIG. 3 shows the treadwear/hysterisis performance of these blends. The pure ingredient grades show the typical trade-off between treadwear and hysterisis. Interestingly, the blends fall on both sides of the typical trade-off line; that is, some of the blends have better performance, and others have worse performance. While the differences are small, they exceed the measurement error. The blends truly have a different treadwear/hysterisis relationship. But, none of the blends have the same low hysterisis as the reference grade, Vulcan® 1436 carbon black. With proper blending, a blend that mimics the aggregate size distribution of the wide ASD carbon blacks produced in a single furnace reactor can be achieved.

For the blends with poor performance, the difference between the measured and predicted CDBP is large. For the blends with good performance, the opposite is true. FIG. 4 shows the measured CDBP for the blends, compared to the CDBP predicted from linear addition of the ingredient grades. Several of the blends have much lower CDBP than expected from the ingredient grades. FIG. 5 shows that the treadwear/hysterisis performance is well correlated with the measured CDBP of the blends. (Since the blends were all aimed at two specific target grades, CDBP deviation from predicted correlates very well with measured CDBP of the blends.)

When carbon blacks are blended, the analytical properties of the blend, particularly the DBP and CDBP, and to a lesser extent the Tint, do not appear to follow linear blending rules.

The rubber properties of compounds made with blended carbon blacks can be predicted from the analytical properties of the carbon black blend, but not from the analytical properties of the ingredient grades.

In specific applications, blends of carbon black can give improved performance compared to a single grade. This is particularly true when a performance property has a trade-off with carbon black dispersion quality. In the Tables, the Iodine number is in mg/g, Tint is in %, DBP and CDBP are in cc/100 g, BET ($N_2$) surface area is in $m^2/g$, STSA is in $m^2/g$.

TABLE 1

| EPDM Evaluation Formulation (phr) | |
|---|---|
| Vistalon MD800 | 115 |
| Sunpar 2280 | 60 |
| Zinc Oxide | 5 |
| Sulpur | 1 |
| Stearic acid | 1 |
| OMYA BSH | 20 |
| Carbon Black | 77 (70 for Sterling SO) |
| Perkacit MBT E80% | 1.5 |
| Rhenogran TP-50 | 2.0 |
| Rhenoran CLD-80 | 1.25 |
| Rhenogran Geniplex E-80 | 0.5 |

TABLE 2

| SBR Evaluation Formulation (phr) | |
|---|---|
| SBR1512 | |
| Carbon Black | 77 (70 for Sterling SO) |
| Perkacit MBT E80% | 1.5 |

TABLE 3

Analytical Properties of Carbon Blacks Used in EPDM UHF Receptivity Experiment

|  | Spheron 5000A | Vulcan 1391 | Predicted 90/10 Blend | Measured 90/10 Blend | Sterling SO (average of 17 samples) |
|---|---|---|---|---|---|
| Iodine Number | 26.5 | 200.8 | 43.9 | 43.9 | 41.8 |
| STSA | 27.7 | 158.4 | 40.8 | 40.3 | 40.9 |
| DBP | 119 | 133.9 | 120.5 | 112.4 | 116.1 |
| CDBP | 82.6 | 98.4 | 84.2 | 78.2 | 83.1 |
| Tint | 44.1 | 143.1 | 54.0 | 52.6 | 60.6 |

TABLE 4

Analytical properties of ingredient carbon blacks used for the treadwear/hysterisis experiment

|  | BET N2 | STSA | CDBP | Tint |
|---|---|---|---|---|
| M-8519 | 40.8 | 39.9 | 87.5 | 56.8 |
| M-8733 | 85.4 | 83.5 | 105.9 | 97.7 |
| M-8244 | 85.7 | 82.1 | 111.5 | 101.2 |
| M-8549 | 158.9 | 139.7 | 106.3 | 141.2 |
| M-8540 | 250.7 | 189.2 | 112.5 | 154.3 |
| M-8547 | 296.1 | 195.8 | 118.7 | 146.2 |
| M-8543 | 308.1 | 200.2 | 118.8 | 147.1 |
| M-8546 | 357 | 222.5 | 114.8 | 147.9 |

TABLE 5

Typical Example showing CDBP depression for one of the Blends from the Treadwear/Hysterisis Experiment

|  | M-8519 70% | M-8547 30% | Predicted 70/30 Blend | Measured 70/30 Blend |
|---|---|---|---|---|
| BET N2 | 40.8 | 296.1 | 117.4 | 111.5 |
| STSA | 39.9 | 195.8 | 86.7 | 88.5 |
| CDBP | 87.5 | 118.7 | 96.9 | 87.7 |
| Tint | 56.8 | 146.2 | 83.6 | 81.4 |

Applicants specifically incorporate the entire contents of all cited references in this disclosure. Further, when an amount, concentration, or other value or parameter is given as either a range, preferable range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A polymeric product comprising at least one polymer and a blend of two or more different types of fillers having different physical, chemical, or morphological properties, wherein the blend of fillers have a unimodal pore size distribution and/or a unimodal aggregate size distribution, wherein said two or more different types of fillers each have a different DBP and said blend has a DBP that is lower than an average DBP of each filler present based on each individual DBP and amount of each filler present or wherein said two or more different types of fillers each have a different crushed DBP and said blend has a crushed DBP that is lower than any crushed DBP of each individual filler present.

2. The polymeric product of claim 1, wherein said two or more different types of fillers are two or more different types of carbon blacks.

3. The polymeric product of claim 1, wherein said at least one polymer is at least one elastomer.

TABLE 6

Blend compositions and analytical properties for the treadwear/hysterisis experiment

| Target Grade | Ingredient Grades M- | | | | | | | | BET N2 | STSA | CDBP | Tint |
|---|---|---|---|---|---|---|---|---|---|---|---|---|
|  | 8244 | 8733 | 8540 | 8543 | 8546 | 8547 | 8549 | 8519 | | | | |
| Binary Blends | | | | | | | | | | | | |
| Vulcan ® 1436 | 88% | — | 12% | — | — | — | — | — | 93.9 | 91.3 | 111.0 | 105.5 |
| Vulcan ® 1436 | 90% | — | — | 10% | — | — | — | — | 95.1 | 92.3 | 110.5 | 105.5 |
| Vulcan ® 1436 | 91% | — | — | — | 9% | — | — | — | 95.0 | 92.3 | 112.0 | 105.0 |
| Vulcan ® 1436 | — | 91% | — | — | — | 9% | — | — | 98.6 | 94.4 | 106.7 | 104.2 |
| Vulcan ® 1436 | 79% | — | — | — | — | 22% | — | — | 94.9 | 92.3 | 110.9 | 110.1 |
| Vulcan ® 1436 | — | — | — | — | — | 30% | — | 70% | 111.5 | 88.5 | 87.7 | 81.4 |
| Vulcan ® 7H | — | — | 50% | — | — | — | — | 50% | 138.5 | 114.1 | 96.4 | 102.5 |
| Vulcan ® 7H | — | — | — | 44% | — | — | — | 56% | 149.2 | 111.6 | 94.2 | 90.6 |
| Vulcan ® 7H | — | — | — | — | 40% | — | — | 61% | 158.1 | 115.2 | 90.9 | 89.9 |
| Vulcan ® 7H | — | — | — | — | — | 47% | — | 53% | 149.0 | 112.3 | 91.1 | 93.6 |
| Vulcan ® 7H | — | — | — | — | — | — | 73% | 27% | 129.0 | 112.8 | 92.8 | 112.6 |
| Vulcan ® 7H | — | 47% | — | — | — | — | 53% | — | 125.1 | 114.3 | 104.2 | 117.9 |
| Ternary Blends | | | | | | | | | | | | |
| Vulcan ® 1436 | — | 70% | — | 17% | — | — | — | 14% | 105.4 | 96.3 | 106.8 | 101.6 |
| Vulcan ® 1436 | — | 68% | — | — | 15% | — | — | 17% | 109.0 | 99.3 | 100.8 | 99.2 |
| Vulcan ® 1436 | — | 67% | 17% | — | — | — | — | 16% | 103.3 | 97.2 | 98.7 | 101.2 |
| Vulcan ® 7H | — | 28% | — | — | 33% | — | — | 39% | 145.3 | 113.7 | 94.2 | 98.4 |
| Vulcan ® 7H | — | — | — | 33% | — | — | 17% | 50% | 134.8 | 105.6 | 89.5 | 94.7 |
| Vulcan ® 7H | — | — | — | — | 16% | — | 44% | 40% | 137.5 | 111.1 | 90.6 | 101.6 |

4. The polymeric product of claim 1, wherein said at least one polymer comprises at least one elastomer that forms an elastomeric product that is a tire or a part thereof.

5. The polymeric product of claim 1, wherein said unimodal pore size distribution and/or unimodal aggregate size distribution has an extended shoulder.

6. A polymeric product comprising at least one polymer and a blend of carbon black comprising two or more different types of carbon blacks having different physical, chemical, or morphological properties, wherein the blend is a unimodal pore size distribution and/or a unimodal aggregate size distribution and/or unimodal Stokes diameter distribution, wherein said two or more different types of carbon blacks each have a different DBP and said blend has a DBP that is lower than an average DBP of each carbon black present based on each individual DBP and amount of each carbon black present or wherein said two or more different types of carbon blacks each have a different crushed DBP and said blend has a crushed DBP that is lower than any crushed DBP of each individual carbon black present.

7. The polymeric product of claim 6, wherein said blend has a unimodal pore size distribution.

8. The polymeric product of claim 6, wherein said blend has a unimodal aggregate size distribution.

9. The polymeric product of claim 6, wherein said blend has a unimodal Stokes diameter distribution.

10. The polymeric product of claim 6, wherein said blend has a unimodal Stokes diameter distribution with a Stokes diameter of from about 0.1 to about 0.3 micron.

11. The polymeric product of claim 6, wherein said two or more different types of carbon blacks each have a different DBP and said blend has a DBP that is lower than an average DBP of each carbon black present based on each individual DBP and amount of each carbon black present.

12. The polymeric product of claim 6, wherein said two or more different types of carbon blacks each have a different DBP and said blend has a DBP that is lower than any DBP of each individual carbon black present.

13. The polymeric product of claim 6, consisting essentially of two or more different types of carbon blacks.

14. The polymeric product of claim 6, consisting of two or more different types of carbon blacks.

15. The polymeric product of claim 6, wherein said blend has a DBP that is 1% or more lower than the average DBP of each carbon black present based on each individual DBP and amount of each carbon black present.

16. The polymeric product of claim 6, wherein said blend has a DBP that is 3% or more lower than the average DBP of each carbon black present based on each individual DBP and amount of each carbon black present.

17. The polymeric product of claim 6, wherein said blend has a DBP that is 5% or more lower than the average DBP of each carbon black present based on each individual DBP and amount of each carbon black present.

18. The polymeric product of claim 6, wherein said unimodal pore size distribution and/or unimodal aggregate size distribution has an extended shoulder.

19. The polymeric product of claim 6, wherein said at least one polymer is at least one elastomer.

20. The polymeric product of claim 6, wherein said at least one polymer comprises at least one elastomer that forms an elastomeric product that is a tire or a part thereof.

* * * * *